US012590226B2

(12) United States Patent (10) Patent No.: US 12,590,226 B2
Choi et al. (45) Date of Patent: Mar. 31, 2026

(54) ADHESIVE COMPOSITION AND SURFACE PROTECTION FILM

(71) Applicant: LG CHEM, LTD., Seoul (KR)

(72) Inventors: Jeong Min Choi, Daejeon (KR); Jang Soon Kim, Daejeon (KR); Hyun Goo Kang, Daejeon (KR); Jae Seung Lym, Daejeon (KR)

(73) Assignee: Xinmei Fontana Holding (Hong Kong) Limited, Hong Kong (CN)

( * ) Notice: Subject to any disclaimer, the term of this patent is extended or adjusted under 35 U.S.C. 154(b) by 497 days.

(21) Appl. No.: 18/022,086

(22) PCT Filed: Aug. 13, 2021

(86) PCT No.: PCT/KR2021/010769
§ 371 (c)(1),
(2) Date: Feb. 17, 2023

(87) PCT Pub. No.: WO2022/039445
PCT Pub. Date: Feb. 24, 2022

(65) Prior Publication Data
US 2024/0010875 A1 Jan. 11, 2024

(30) Foreign Application Priority Data
Aug. 18, 2020 (KR) ........................ 10-2020-0103553

(51) Int. Cl.
*C09J 7/40* (2018.01)
*C09J 7/20* (2018.01)
(Continued)

(52) U.S. Cl.
CPC .............. *C09J 7/203* (2018.01); *C09J 7/403* (2018.01); *C09J 11/06* (2013.01); *C09J 133/10* (2013.01);
(Continued)

(58) Field of Classification Search
CPC ... C09J 7/203; C09J 7/403; C09J 11/06; C09J 133/10; C09J 175/04; C09J 2301/312;
(Continued)

(56) References Cited

U.S. PATENT DOCUMENTS

2013/0017392 A1* 1/2013 Inao ................... C08G 18/4825
428/336
2020/0343479 A1* 10/2020 Choi ...................... H10K 59/40
2023/0323171 A1* 10/2023 Choi ................... C08G 18/791
428/41.8

FOREIGN PATENT DOCUMENTS

CN 108384474 A 8/2018
JP 2002235052 A * 8/2002
(Continued)

OTHER PUBLICATIONS

Machine translation of JP 2002-235052 A (Year: 2002).*
(Continued)

*Primary Examiner* — Callie E Shosho
*Assistant Examiner* — Steven A Rice
(74) *Attorney, Agent, or Firm* — Ricky Lam

(57) ABSTRACT
The present disclosure provides an adhesive composition and a surface protective film including the same, which have low low-speed and high-speed peel forces and a high residual adhesion rate.

13 Claims, 1 Drawing Sheet

(51) Int. Cl.

| | | |
|---|---|---|
| *C09J 11/06* | (2006.01) | |
| *C09J 133/10* | (2006.01) | |
| *C09J 175/04* | (2006.01) | |

(52) U.S. Cl.
CPC ....... *C09J 175/04* (2013.01); *C09J 2301/312* (2020.08); *C09J 2301/408* (2020.08); *C09J 2301/414* (2020.08)

(58) Field of Classification Search
CPC ........... C09J 2301/408; C09J 2301/414; C09J 2203/318; C09J 2301/122; C09J 7/30; C09J 133/066; C09J 7/29; C09J 2433/00; C09J 2475/00; C09J 7/22; C09J 7/40; C09J 7/50; C09J 11/08; C08F 220/1804; C08G 18/6279; C08G 18/725; C08G 18/755; C08G 18/792; C08K 3/017; C08K 5/29; C08K 2201/017; C08L 33/04
USPC ...................................... 428/423.1
See application file for complete search history.

(56) References Cited

FOREIGN PATENT DOCUMENTS

| | | | | | | |
|---|---|---|---|---|---|---|
| JP | 2006077140 | A | * | 3/2006 | | |
| JP | 2009-001655 | A | | 1/2009 | | |
| JP | 2015-160866 | A | | 9/2015 | | |
| JP | 2016194016 | | | 11/2016 | | |
| JP | 6319331 | B2 | | 4/2018 | | |
| JP | 2018058952 | A | * | 4/2018 | | |
| JP | 2018119028 | | | 8/2018 | | |
| JP | 2018123282 | A | * | 8/2018 | .............. | C09D 5/24 |
| JP | 2019-147924 | A | | 9/2019 | | |
| KR | 10-2014-0136265 | A | | 11/2014 | | |
| KR | 10-1628435 | B1 | | 6/2016 | | |
| KR | 20170034636 | A | * | 3/2017 | ........... | C09J 133/16 |
| KR | 10-1737863 | B1 | | 5/2017 | | |
| KR | 10-2018-0090735 | A | | 8/2018 | | |
| KR | 10-2035869 | B1 | | 10/2019 | | |
| KR | 10-2129543 | B1 | | 7/2020 | | |
| KR | 10-2020-0092895 | A | | 8/2020 | | |
| TW | 201840798 | A | | 11/2018 | | |
| WO | 2015/016029 | A1 | | 2/2015 | | |
| WO | WO-2019083255 | A2 | * | 5/2019 | ........... | H01L 51/56 |
| WO | 2020/153755 | A1 | | 7/2020 | | |
| WO | 2020153753 | | | 7/2020 | | |
| WO | 2020153754 | | | 7/2020 | | |

OTHER PUBLICATIONS

Machine translation of JP 2006-077140 A (Year: 2006).*
Machine translation of KR 10-2017/0034636 A (Year: 2017).*
Machine translation of JP 2018-123282 A (Year: 2018).*
Machine translation of JP 2018-058952 A (Year: 2018).*

* cited by examiner

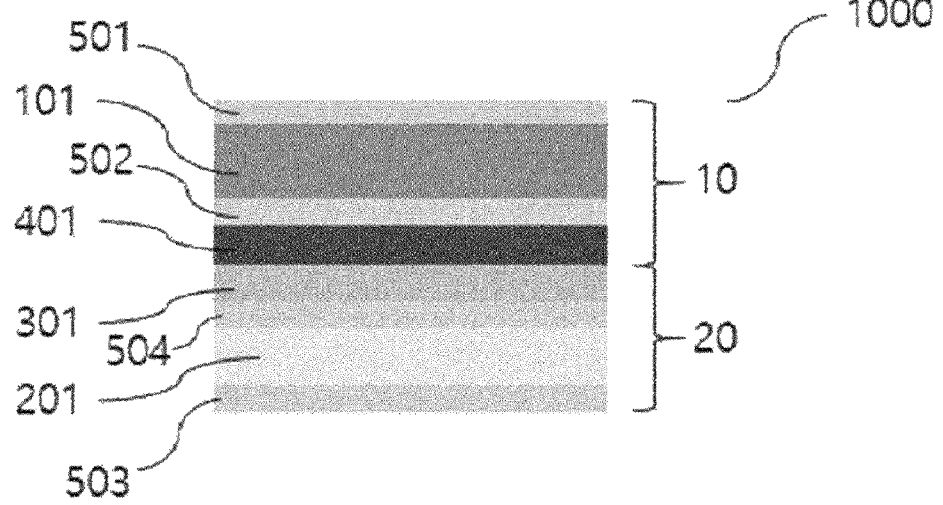

ADHESIVE COMPOSITION AND SURFACE PROTECTION FILM

The present application is a national phase entry pursuant to 35 U.S.C. § 371 of International Application No. PCT/KR2021/010769 filed Aug. 18, 2021, and claims priority to and the benefit of Korean Patent Application No. 10-2020-0103553 filed with the Korean Intellectual Property Office on Aug. 18, 2020, the entire contents of which are incorporated herein by reference.

FIELD

The present disclosure relates to an adhesive composition and a surface protective film. Specifically, the present disclosure relates to an adhesive composition and a surface protective film, which have a high residual adhesion rate.

BACKGROUND

During the process of manufacturing an OLED, it is necessary to prevent an encapsulation layer on a panel surface from being damaged by external contaminants and external stimuli until a plastic OLED panel is bonded to a touch part after manufacturing of the plastic OLED panel. To protect the encapsulation layer, a process protective film for thin film encapsulation (TFE) is generally used during the plastic OLED manufacturing process.

This process protective film usually includes a substrate layer, an adhesive layer, and a release film, for protecting the surface of the adhesive layer laminated thereon. After the release film is peeled off from the process protective film having the release film laminated thereon, the process protective film is laminated so that the adhesive layer comes into contact with the surface of an adherend such as an electronic component whose surface needs to be protected during the process. Thereafter, the process protective film is peeled off from the adherend if protection is no longer is required after the process and another process should be performed.

This process protective film is a film that is laminated on the upper surface of the OLED panel to protect the OLED device. The process protection film needs to have an anti-static function in order to prevent damage to the OLED device from either by static electricity generated upon contact with manufacturing equipment or by static electricity capable of occurring when peeling off the laminated protective film, and to prevent panel malfunction from fine charges due to any residual static electricity. The process protective film also needs to exhibit a low peeling electrification voltage when peeling off the release film therefrom.

In addition, since the process protective film is a film that is used temporarily to protect an electronic component during the manufacturing process, it needs to have excellent wettability on the adherend and exhibit low peel force and a low residue level when the protective film is removed to perform an additional process. The process protective film should not leave contaminants after peeling, and should not cause electrostatic damage to the adherend upon peeling. Accordingly, the process protective film needs to have antistatic properties.

Conventionally, a plasticizer, a low-molecular-weight additive, is added to an adhesive composition containing urethane resin to realize lower peel force, and an antistatic layer is provided to realize excellent antistatic properties. However, when the plasticizer is added to the adhesive composition, the surface of an adherend is contaminated by migration of the plasticizer added in large amounts.

SUMMARY

A technical problem to be solved by the present disclosure is to provide an adhesive composition and a surface protective film, which exhibit a low residue level, low peel force and high residual adhesion rate.

According to one aspect of the present disclosure, there is provided an adhesive composition comprising a hydroxyl group-containing urethane resin, an isocyanate-based curing agent, and a (meth)acrylate copolymer, wherein the (meth)acrylate copolymer is obtained by polymerization from a monomer mixture which contains a (meth)acrylate monomer containing a hydroxyl group, a (meth)acrylate monomer containing a fluorinated substituent, an alkyl (meth)acrylate monomer having 1 to 10 carbon atoms and an alkyl (meth) acrylate monomer having 12 to 22 carbon atoms.

According to another aspect of the present disclosure, there is provided a surface protective film including a release film and a substrate film, wherein the substrate film includes: a first substrate layer; an antistatic layer positioned on at least one surface of the first substrate layer; and an adhesive layer including a cured product of the adhesive composition, and the release film and the adhesive layer are in direct contact with each other.

The adhesive composition according to one embodiment of the present disclosure is effective in that it may be easily peeled off from an adherend at low speed or high speed due to the low adhesiveness thereof, and does not contaminate the adherend surface because it leaves no residue on the adherend surface.

The surface protective film according to another embodiment of the present disclosure is effective in that it may be easily peeled off from an adherend at low speed or high speed due to the low adhesiveness thereof, and does not contaminate the adherend surface because it leaves no residue on the adherend surface.

BRIEF DESCRIPTION OF DRAWINGS

FIG. 1 is a schematic sectional view of a surface protective film according to one embodiment of the present disclosure.

DETAILED DESCRIPTION

Throughout the present specification, it is to be understood that when any part is referred to as "including" any component, it does not exclude other components, but may further include other components, unless otherwise specified.

In the present specification, the term "weight-average molecular weight" means the molecular weight in terms of polystyrene measured by gel permeation chromatography (GPC) using, as standards, monodispersed polystyrenes (standard samples) having various polymerization degrees, which are commercially available as standards for molecular weight measurement. The weight-average molecular weight is given in units of g/mol. In the present specification, the term "molecular weight" refers to a weight-average molecular weight, unless specified otherwise.

In the present specification, the term "antistatic layer" means a layer intended to suppress the generation of static electricity.

Hereinafter, the present disclosure will be described in more detail.

According to one embodiment of the present disclosure, there is provided an adhesive composition comprising a hydroxyl group-containing urethane resin, an isocyanate-based curing agent, and a (meth)acrylate copolymer, wherein the (meth)acrylate copolymer is obtained by polymerization from a monomer mixture which contains a (meth) acrylate monomer containing a hydroxyl group, a (meth) acrylate monomer containing a fluorinated substituent, an alkyl (meth)acrylate monomer having 1 to 10 carbon atoms and an alkyl (meth)acrylate monomer having 12 to 22 carbon atoms. The (meth)acrylate copolymer is comprising a (meth)acrylate monomer containing a hydroxyl group, a (meth)acrylate monomer containing a fluorinated substituent, an alkyl (meth)acrylate monomer having 1 to 10 carbon atoms and an alkyl (meth)acrylate monomer having 12 to 22 carbon atoms.

The adhesive composition according to an embodiment of the present disclosure may be applied to and cured on an adherend to form an adhesive layer. The adhesive layer may be easily peeled off from the adherend due to the low peel force thereof, leaves less adhesive residue on the adherend surface, and may be peeled off from the adherend without contaminating the adherend surface, due to a high residual adhesion rate thereof.

(1) Urethane Resin

The adhesive composition according to one embodiment of the present disclosure may contain a urethane resin as a main component. The expression "contain a urethane resin as a main component" means that the urethane resin is contained in the adhesive composition in an amount of about 50 wt % or more, which may be larger than the contents of the other components.

The urethane resin contains a hydroxyl group. As the urethane resin contains a hydroxyl group, the hydroxyl group of the urethane resin may serve as a crosslinking point when the adhesive composition is formed into an adhesive layer, that is, when the adhesive composition is cured to form an adhesive layer. Thus, when a polyurethane polyol resin produced from a polyol and a polyfunctional isocyanate is used as the urethane resin as described above, the polyurethane polyol resin may be preferably produced using the polyol and the polyfunctional isocyanate so that the ratio of the number of moles of isocyanate groups (NCO) in the polyfunctional isocyanate to the number of moles of hydroxyl groups (OH) in the polyol, (NCO/OH), is less than 1.

The urethane resin contained in the adhesive composition according to one embodiment of the present disclosure is not particularly limited, but may be a polyurethane polyol resin or a polyurethane prepolymer polyol, which is obtained by polymerizing a mixture for urethane production containing a polyol and a polyfunctional isocyanate.

As the raw material polyol for producing the polyurethane polyol resin, one type of polyol may be used, or two or more types of polyols may be used together. In addition, as the raw material polyol, a bifunctional polyol and a trifunctional or higher polyol may be used together, and in this case, one or more bifunctional polyols and one or more trifunctional or higher polyols may be used together.

Examples of the raw material polyol include ethylene glycol, diethylene glycol, 1,3-butanediol, 1,4-butanediol, neopentyl glycol, 3-methyl-1,5-pentanediol, 2-butyl-2-ethyl-1,3-propanediol, 2,4-diethyl-1,5-pentanediol, 1,2-hexanediol, 1,6-hexanediol, 1,8-octanediol, 1,9-nonanediol, 2-methyl-1,8-octanediol, 1,8-decanediol, octadecanediol, glycerin, trimethylolpropane, pentaerythritol, hexanetriol, polypropylene glycol, and the like. Examples of an acid component that may be used include succinic acid, methyl succinic acid, adipic acid, pimelic acid, azelaic acid, sebacic acid, 1,12-dodecanoic acid, 1,14-tetradecanoic acid, dimer acid, 2-methyl-1,4-cyclohexanedicarboxylic acid, 2-ethyl-1, 4-cyclohexanedicarboxylic acid, terephthalic acid, isophthalic acid, phthalic acid, 1,4-naphthalenedicarboxylic acid, 4,4'-biphenyldicarboxylic acid, and acid anhydrides thereof.

In addition, the raw material polyol may contain at least one of polyester polyol, polyether polyol, polycaprolactone polyol, and polycarbonate polyol. Specific examples thereof include, but not limited to, those described below.

Examples of the polyether polyol include polyether polyols obtained by addition polymerization of alkylene oxide (e.g., ethylene oxide, propylene oxide, butylene oxide, etc.) to initiators such as water; low-molecular-weight polyols such as propylene glycol, ethylene glycol, glycerin, trimethylolpropane, or pentaerythritol; bisphenols such as bisphenol A; or dihydroxybenzenes such as catechol, resorcin, or hydroquinone. Specific examples of the polyether polyol include polyethylene glycol, polypropylene glycol, polytetramethylene glycol, and the like.

Examples of the polycaprolactone polyol include caprolactone-based polyesterdiols obtained by ring-opening polymerization of cyclic ester monomers such as ε-caprolactone or σ-valerolactone.

Examples of the polycarbonate polyol include: polycarbonate polyol obtained by polycondensation reaction between the polyol component and phosgene; polycarbonate polyol obtained by transesterification polycondensation of the polyol component with diester carbonate such as dimethyl carbonate, diethyl carbonate, dipropyl carbonate, diisopropyl carbonate, dibutyl carbonate, ethyl butyl carbonate, ethylene carbonate, propylene carbonate, diphenyl carbonate, or dibenzyl carbonate; copolymerized polycarbonate polyol obtained by using two or more of the polyol components in combination; polycarbonate polyol obtained by esterifying the above-listed polycarbonate polyol with a carboxyl group-containing compound; polycarbonate polyol obtained by etherifying the above-listed polycarbonate polyol with a hydroxyl group-containing compound; polycarbonate polyol obtained by transesterifying the above-listed polycarbonate polyol with an ester compound; polycarbonate polyol obtained by transesterifying the above-listed polycarbonate polyol with a hydroxyl group-containing compound; polyester-based polycarbonate polyol obtained by polycondensation reaction of the above-listed polycarbonate polyol with a dicarboxylic acid compound; and copolymerized polyether-based polycarbonate polyol obtained by copolymerizing the above-listed polycarbonate polyol with alkylene oxide.

The number-average molecular weight of the raw material polyol contained in the mixture for urethane production may be appropriately selected. In one embodiment, the number-average molecular weight of the polyol may be appropriately 100 to 40,000, but is not limited thereto.

As the polyfunctional isocyanate compound, any suitable polyfunctional isocyanate compound that may be used in a urethanation reaction may be employed. Examples of this polyfunctional isocyanate compound include a polyfunctional aliphatic isocyanate compound, a polyfunctional alicyclic isocyanate compound, and a polyfunctional aromatic isocyanate compound.

Examples of the polyfunctional isocyanate compound include, but are not limited to, polyfunctional aliphatic isocyanate, polyfunctional alicyclic isocyanate and polyfunctional aromatic isocyanate compounds, a trimethylolpropane adduct obtained by modifying polyisocyanate with trifunctional isocyanate, a biuret body obtained by reacting polyisocyanate with water, a trimer having an isocyanurate ring, and the like.

Examples of the polyfunctional aliphatic isocyanate compound include, but are not limited to, trimethylene diisocyanate, tetramethylene diisocyanate, pentamethylene diisocyanate, hexamethylene diisocyanate, 1,2-propylene diisocyanate, 1,3-butylene diisocyanate, dodecamethylene diisocyanate, 2,4,4-trimethylhexamethylene diisocyanate, and the like.

Examples of the polyfunctional alicyclic isocyanate compound include, but are not limited to, isophorone diisocyanate (IPDI), 1,4-cyclohexanediisocyanate (CHDI), 4,4'-dicyclohexylmethane diisocyanate (HMDI), bis (isocyanatomethyl) cyclohexane (HXDI), and the like.

Examples of the polyfunctional aromatic isocyanate compound include, but are not limited to, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PDI), m-phenylene diisocyanate (PDI), naphthalene 1,5-diisocyanate (NDI), naphthalene 2,4-diisocyanate (NDI), p-xylylene diisocyanate (XDI), 1,3-bis(1-isocyanato-1-methylethyl) benzene (TMXDI), and the like.

In one embodiment of the present disclosure, as the polyfunctional isocyanate compound, two or more isocyanate compounds may be used in combination, and in this case, the types and contents of the two or more isocyanate compounds may be appropriately selected. For example, as the isocyanate compound contained in the mixture for urethane production, a polyfunctional aromatic isocyanate compound and a polyfunctional aliphatic isocyanate compound may be used in combination.

The weight-average molecular weight of the urethane resin may be 50,000 to 200,000, or 100,000 to 150,000. When a urethane resin having a weight-average molecular weight within the above range is used, the cohesiveness and adhesiveness of the adhesive layer may be appropriately controlled.

The urethane resin may be provided in an amount of 60 wt % or more, preferably 70 to 90 wt %, 75 to 90 wt %, 80 to 90 wt %, or 84 to 90 wt %, based on the total weight of the adhesive composition. That is, the urethane resin is a main component of the adhesive composition and may be provided in the adhesive composition in an amount within the above range.

Appropriate additives may be used in the process of producing the urethane resin. For example, the urethane resin may be produced by adding an antioxidant, a UV absorber, a light stabilizer, an anti-degradation agent, and the like, and the types and contents of the additives may be appropriately determined according to the intended use. Preferably, the urethane resin may be produced to contain anti-degradation agents such as an antioxidant, a UV absorber and a light stabilizer.

In addition, any suitable catalyst may be used in the process of producing the urethane resin. Examples of this catalyst include a tertiary amine-based compound and an organometallic compound. Examples of the organometallic compound include a tin-based compound, a non-tin-based compound, etc. Examples of the tin-based compound include dibutyltin dichloride, dibutyltin oxide, dibutyltin dibromide, dibutyltin dimaleate, dibutyltin dilaurate (DBTDL), dibutyltin diacetate, dibutyltin sulfide, tributyltin sulfide, tributyltin oxide, tributyltin acetate, triethyltin ethoxide, tributyltin ethoxide, dioctyltin oxide, tributyltin chloride, tributyltin trichloroacetate, and 2-ethyltin hexanoate.

(2) Isocyanate-Based Curing Agent

The isocyanate-based curing agent is added to crosslink and cure the urethane resin and (meth)acrylate copolymer contained in the adhesive composition.

Specifically, a curing agent containing an isocyanate group that reacts with a hydroxyl group contained in each of the urethane resin and the (meth)acrylate copolymer may crosslink the urethane resin and the (meth)acrylate copolymer.

As the isocyanate-based curing agent, any suitable polyfunctional isocyanate compound that is commonly used in the art may be selected and used as long as it is a compound that may be used for a urethanation reaction. In addition, at least one polyfunctional isocyanate compound selected from among examples listed below may be used as the isocyanate-based curing agent.

Examples of the polyfunctional isocyanate compound include, but are not limited to, polyfunctional aliphatic isocyanate, polyfunctional alicyclic isocyanate and polyfunctional aromatic isocyanate compounds, a trimethylolpropane adduct obtained by modifying polyisocyanate with trifunctional isocyanate, a biuret body obtained by reacting polyisocyanate with water, a trimer having an isocyanurate ring, and the like.

Examples of the polyfunctional aliphatic isocyanate compound include, but are not limited to, trimethylene diisocyanate, tetramethylene diisocyanate, pentamethylene diisocyanate, hexamethylene diisocyanate, 1,2-propylene diisocyanate, 1,3-butylene diisocyanate, dodecamethylene diisocyanate, 2,4,4-trimethylhexamethylene diisocyanate, and the like.

Examples of the polyfunctional alicyclic isocyanate compound include, but are not limited to, isophorone diisocyanate (IPDI), 1,4-cyclohexanediisocyanate (CHDI), 4,4'-dicyclohexylmethane diisocyanate (HMDI), bis (isocyanatomethyl) cyclohexane (HXDI), and the like.

Examples of the polyfunctional aromatic isocyanate compound include, but are not limited to, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PDI), m-phenylene diisocyanate (PDI), naphthalene 1,5-diisocyanate (NDI), naphthalene 2,4-diisocyanate (NDI), p-xylylene diisocyanate (XDI), 1,3-bis(1-isocyanato-1-methylethyl)benzene (TMXDI), and the like.

The isocyanate-based curing agent may be contained in an amount of 10 to 30 parts by weight based on 100 parts by weight of the urethane resin. When the curing agent is contained in an amount within the above range, the adhesive composition may be cured to have an appropriate level of hardness while the curing reaction may smoothly proceed, so that the cured product of the adhesive composition may exhibit an appropriate level of adhesiveness.

The ratio of the number of moles of isocyanate groups in the isocyanate-based curing agent to the number of moles of hydroxyl groups in the urethane resin may be 5.0 or less. When the isocyanate-based curing agent is added so as to have a ratio of the number of moles within the above range, the adhesive composition may exhibit low peel force due to a high degree of curing because it contains few unreacted isocyanate groups.

7
8

(3) (Meth)acrylate Copolymer

Conventionally, a plasticizer, a low-molecular-weight additive, is added to an adhesive composition containing urethane resin to realize lower peel force and excellent antistatic properties. However, when the plasticizer is added to the adhesive composition, the surface of an adherend is contaminated by the plasticizer added in large amounts and the migration of the plasticizer.

The adhesive composition according to one embodiment of the present disclosure solves the above-described problem by utilizing a (meth)acrylate copolymer obtained by copolymerization from a mixture containing specific monomers. Specifically, the (meth)acrylate copolymer contains a hydroxyl group by including a polymerization unit of a (meth)acrylate monomer containing a hydroxyl group, and also contains two types of hydrophobic groups by including a polymerization unit of a (meth)acrylate monomer containing a long-chain alkyl group and a polymerization unit of a (meth)acrylate monomer containing a fluorinated substituent. The long-chain alkyl group is a hydrocarbon chain corresponding to a hydrophobic group, and the fluorinated substituent corresponds to a hydrophobic group because it has a fluorine replacing a portion or all of the hydrogen atoms attached to the carbon atoms of the alkyl group bonded to the ester of acrylate and thus may have hydrophobicity comparable to that of the long-chain alkyl group. The (meth)acrylate copolymer may float to the outer surface portion of the adhesive layer by the hydrophobic group in the process of producing the adhesive layer from the adhesive composition, and low peel force may be achieved by the hydrophobic group of the (meth)acrylate copolymer located on the outer surface portion of the adhesive layer, that is, the surface portion that adheres to the adherend in direct contact therewith. In addition, the hydroxyl group of the (meth) acrylate copolymer may react with the isocyanate-based curing agent and act as a crosslinking site that is crosslinked with the urethane resin, thereby achieving low peel force. Due to the two types of hydrophobic groups and the hydroxyl group, the adhesive layer including the adhesive composition may have excellent durability even in a high-temperature and high-humidity environments. Also, even if the adhesive composition contains a plasticizer or a peel force controlling agent, it is possible to prevent the plasticizer or the peel force controlling agent from contaminating the adherend surface due to its migration from the surface of the adhesive layer to the adherend surface.

The (meth)acrylate copolymer has a weight-average molecular weight of 20,000 to 70,000, 25,000 to 50,000, 27,000 to 42,000, 27,000 to 41,000, 27,000 to 30,000, or 27,000 to 29,000. When a (meth)acrylate copolymer having a weight-average molecular weight within the above range is contained in the adhesive composition, it may be positioned on the surface of the adhesive layer when the adhesive composition is applied, thereby controlling the peel force of the adhesive layer and the degree of curing of the adhesive composition. Specifically, in this case, the surface protective film may have low peel force on an adherend and may leave less residue due to the high residual adhesion rate thereof.

The (meth)acrylate copolymer is obtained by polymerization from a monomer mixture. Specifically, the (meth) acrylate copolymer may be obtained from a monomer mixture by various polymerization methods which are commonly used, such as solution polymerization, bulk polymerization, suspension polymerization, emulsion polymerization, and radiation curing polymerization.

The monomer mixture contains a (meth)acrylate monomer containing a hydroxyl group, a (meth)acrylate monomer containing a fluorinated substituent, an alkyl (meth)acrylate monomer having 1 to 10 carbon atoms, and an alkyl (meth) acrylate monomer having 12 to 22 carbon atoms.

The monomer mixture may contain more than 0 to not more than 10 wt % of the (meth)acrylate monomer containing a hydroxyl group. The content of the hydroxyl group-containing (meth)acrylate monomer may be controlled in consideration of the hydroxyl value of the (meth)acrylate copolymer to be obtained by polymerization, and where the (meth)acrylate copolymer is produced by polymerizing a monomer mixture which contains the hydroxyl group-containing (meth)acrylate monomer in an amount within the above content range, it is possible to prepare an adhesive composition having an appropriate peel force and excellent wettability.

The hydroxyl group-containing (meth)acrylate monomer may include at least one of 2-hydroxyethyl (meth)acrylate, 2-hydroxypropyl (meth)acrylate, 4-hydroxybutyl (meth) acrylate, 6-hydroxyhexyl (meth)acrylate, 8-hydroxyoctyl (meth)acrylate, 2-hydroxyethylene glycol (meth)acrylate, and 2-hydroxypropylene glycol (meth)acrylate.

The monomer mixture may contain more than 0 to not more than 10 wt % of the (meth)acrylate monomer containing a fluorinated substituent. The polymerization unit of the fluorinated substituent-containing (meth)acrylate monomer may correspond to the hydrophobic group in the (meth) acrylate copolymer. Where the (meth)acrylate copolymer is produced by polymerizing the monomer mixture containing the fluorinated substituent-containing (meth)acrylate monomer in an amount within the above range, it is possible to control the peel force of the adhesive layer within an appropriate range.

The fluorinated substituent-containing (meth)acrylate monomer may include at least one of trifluoroethyl (meth) acrylate, tetrafluoro-n-propyl (meth)acrylate, tetrafluoro-t-pentyl (meth)acrylate, hexafluorobutyl (meth)acrylate, hexafluoro-t-hexyl (meth)acrylate, hexafluoro-2,4-bis(trifluoromethyl)pentyl (meth)acrylate, hexafluorobutyl (meth) acrylate, hexafluoroisopropyl (meth)acrylate, heptafluorobutyl (meth)acrylate, octafluoropentyl (meth)acrylate, nonafluoropentyl (meth)acrylate, dodecafluoroheptyl (meth) acrylate, dodecafluorooctyl (meth)acrylate, tridecafluorooctyl (meth)acrylate, tridecafluoroheptyl (meth)acrylate, hexadecafluorodecyl (meth)acrylate, heptadecafluorodecyl (meth)acrylate, octadecafluoroundecyl (meth)acrylate, nonadecafluoroundecyl (meth)acrylate, and eicosafluorododecyl (meth)acrylate.

The monomer mixture may contain 70 to 95 wt % of the alkyl (meth)acrylate monomer having 1 to 10 carbon atoms and 1 to 10 wt % of the alkyl (meth)acrylate monomer having 12 to 22 carbon atoms. That is, the monomer mixture contains a short-chain alkyl (meth)acrylate monomer and a long-chain alkyl (meth)acrylate monomer, and in particular, the polymerization unit of the long-chain alkyl (meth) acrylate monomer may correspond to another hydrophobic group in the (meth)acrylate copolymer. Where the (meth) acrylate copolymer is produced by polymerizing the monomer mixture containing the alkyl (meth)acrylate monomers in amounts within the above ranges, an adhesive layer formed by curing the adhesive composition containing the (meth)acrylate copolymer may have an appropriate peel force.

The alkyl (meth)acrylate monomer having 1 to 10 carbon atoms may include at least one of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, and isononyl (meth) acrylate.

The alkyl (meth)acrylate monomer having 12 to 22 carbon atoms may include at least one of lauryl (meth)acrylate, tetradecyl (meth)acrylate, stearyl (meth)acrylate, cetyl (meth)acrylate, behenyl (meth)acrylate, and eicosyl (meth) acrylate.

The monomer mixture may further contain other monomer components polymerizable with the (meth)acrylate monomers within a range that does not impair the effects of the present disclosure. Examples of the other monomer components include, but not limited to, those described below.

Examples of the other (meth)acrylate monomers include, but are not limited to, cyclohexyl (meth)acrylate, phenoxy (meth)acrylate, 2-ethylphenoxy (meth)acrylate, benzyl (meth)acrylate, phenyl (meth)acrylate, 2-ethylthiophenyl (meth)acrylate, 2-phenylethyl (meth)acrylate, 3-phenylpropyl (meth)acrylate, 4-phenylbutyl (meth)acrylate, 2,2-methylphenylethyl (meth)acrylate, 2,3-methylphenylethyl (meth) acrylate, 2,4-methylphenylethyl (meth)acrylate, 2-(4-propylphenyl) ethyl (meth)acrylate, 2-(4-(1-methylethyl) phenyl)ethyl (meth)acrylate, 2-(4-methoxyphenyl) ethyl (meth)acrylate, 2-(4-cyclohexylphenyl) ethyl (meth)acrylate, 2-(2-chlorophenyl) ethyl (meth)acrylate, 2-(3-chlorophenyl)ethyl (meth)acrylate, 2-(4-chlorophenyl)ethyl (meth)acrylate, 2-(4-bromophenyl)ethyl (meth)acrylate, 2-(3-phenylphenyl)ethyl (meth)acrylate, and 2-(4-benzylphenyl)ethyl (meth)acrylate.

The monomer mixture may include an initiator for initiating a polymerization reaction. Benzoyl peroxide may be used as the initiator, and the content of the initiator may be 0.5 parts by weight to less than 3 parts by weight based on 100 parts by weight of the total weight of the monomers.

The (meth)acrylate copolymer may be contained in an amount of 0.5 to 5 parts by weight, 0.5 to 3 parts by weight, 1 to 3 parts by weight, 1 to 2.5 parts by weight, or 1.5 to 2.5 parts by weight, based on 100 parts by weight of the urethane resin. Where the (meth)acrylate copolymer is contained in an amount within the above range, an adhesive layer formed by curing the adhesive composition may have an appropriate peel force.

(4) Others

The adhesive composition according to one embodiment of the present disclosure may contain other additives in addition to the above-described components. For example, the adhesive composition may further contain a solvent, a catalyst, a curing retardant, an adhesive resin, a plasticizer, a peel strength controlling agent, a photoinitiator, a hydrolysis inhibitor, an antioxidant, a curing accelerator, an anti-retardation agent, etc., depending on the intended use, and the contents of these additives may also be appropriately selected.

According to one embodiment of the present disclosure, the adhesive composition may further contain a solvent. As the solvent, there may be used a known appropriate solvent, for example, but not limited to, a ketone-based solvent, an acetate-based solvent, or a toluene-based solvent.

According to one embodiment of the present disclosure, the adhesive composition may further contain a catalyst. The catalyst may be appropriately selected in consideration of the purpose of the present application, and for example, it may be contained in an amount of 10 ppm to 500 ppm based on the urethane polymer. As the catalyst, a tin-based catalyst such as dibutyltin dilaurate (DBTDL), an iron-based catalyst such as FeAA, a lead-based catalyst, salts of organic and inorganic acids, an organometallic derivative, an amine-based catalyst, a diazabicycloundecene-based catalyst, or the like may be used, but the catalyst is not limited thereto.

According to one embodiment of the present disclosure, the adhesive composition may further contain a curing retardant. As the curing retardant, any suitable known material may be used, and the content of the curing retardant may be appropriately selected. In one embodiment, acetyl acetone may be used as the curing retardant.

According to another embodiment of the present disclosure, there is provided a surface protective film including a release film and a substrate film, wherein the substrate film includes: a first substrate layer; an antistatic layer positioned on at least one surface of the first substrate layer; and an adhesive layer including a cured product of the adhesive composition, and the release film and the adhesive layer are in direct contact with each other.

The surface protective film serves to protect an adherend during a process and includes a release film that is removed before attachment of the surface protective film to the adherend. In addition, the surface protective film includes a substrate film, which is attached to the adherend and serves to protect the adherend surface. The substrate film is peeled off from the adherend surface later.

FIG. 1 is a schematic sectional view showing a surface protective film according to one embodiment of the present disclosure. Referring to FIG. 1, a surface protective film 1000 includes a release film 10 and a substrate film 20. The substrate film 20 may include a first substrate layer 201, antistatic layers 503 and 504, and an adhesive layer 301.

(1) Substrate Film

The substrate film includes: a first substrate layer; an antistatic layer positioned on at least one surface of the first substrate layer; and an adhesive layer including a cured product of the adhesive composition.

The first substrate layer may serve to maintain the shape of the substrate film, and may include, but is not limited to, at least one selected from the group consisting of: polyethylene terephthalate; polytetrafluoroethylene; polyethylene; polypropylene; polybutene; polybutadiene; a vinyl chloride copolymer; polyurethane; ethylene-vinyl acetate; an ethylene-propylene copolymer; an ethylene-ethyl acrylate copolymer; an ethylene-methyl acrylate copolymer; polyimide; nylon; a styrene-based resin or elastomer; a polyolefin-based resin or elastomer; other elastomers; a polyoxyalkylene-based resin or elastomer; a polyester-based resin or elastomer; a polyvinyl chloride-based resin or elastomer; a polycarbonate-based resin or elastomer; a polyphenylene sulfide-based resin or elastomer; mixtures of hydrocarbons; a polyamide-based resin or elastomer; an acrylate-based resin or elastomer; an epoxy-based resin or elastomer; a silicone-based resin or elastomer; and liquid crystal polymers.

The thickness of the first substrate layer may be appropriately selected in consideration of the purpose of the present disclosure. For example, the thickness of the first substrate layer may be 25 μm to 150 μm, 50 μm to 125 μm, or 50 μm to 100 μm.

The antistatic layer may be positioned on at least one surface of the first substrate layer, that is, one surface or both surfaces thereof.

The antistatic layer may be formed by a known method in order to achieve a desired effect. For example, the antistatic layer may be formed on one or both surfaces of the first substrate layer by an in-line coating method. The in-line coating method is a method of uniaxially stretching an extruded film, and then applying a coating layer thereto, followed by biaxial stretching, thus obtaining a finished film. The in-line coating method has advantages in that, since coating is performed during the film production process, the adhesion between the coating layer and the film increases, and since the application of the coating layer is continuously performed together with film production, the process is shortened, and the film may be produced to have the smallest possible thickness.

In the present disclosure, the antistatic layer may be formed of an appropriate antistatic composition in consideration of the purpose of the present disclosure. For example, the antistatic layer may include a thermosetting binder resin in a range that does not affect the effects of the present disclosure.

As used herein, the term "thermosetting binder resin" refers to a binder resin that can be cured through an appropriate heating or aging process. For example, as the thermosetting binder resin, one or a mixture of two or more selected from the group consisting of acrylic resin, urethane-based resin, a urethane-acrylic copolymer, ester-based resin, ether-based resin, amide-based resin, epoxy-based resin, and melamine resin may be used, but the thermosetting binder resin is not limited thereto.

In one example, the antistatic layer may include a conductive material. The conductive material may include, but is not limited to, a conductive polymer or carbon nanotubes.

Examples of the conductive polymer include, but are not limited to, a polyaniline-based polymer compound, a poly-pyrrole-based polymer compound, a polythiophene-based polymer compound, and derivatives and copolymers thereof.

The carbon nanotubes may have a tubular shape formed by rolling up graphite sheets composed of hexagonal rings of six carbon atoms bound together. The carbon nanotubes have excellent rigidity and electrical conductivity, and thus when the carbon nanotubes are included in the antistatic layer, the hardness of the antistatic layer may increase and the antistatic performance thereof may be enhanced.

The thickness of each antistatic layer may independently be 600 nm or less, 10 nm to 400 nm, 20 nm to 300 nm, or 20 nm to 100 nm.

The adhesive layer includes a cured product of the adhesive composition. Details regarding the adhesive composition may be the same as described above.

The adhesive layer may be formed by applying and curing the adhesive composition on the surface of the first substrate layer. The method of curing the adhesive composition is not particularly limited, and for example, there may be used a method of curing the adhesive composition by an appropriate drying, heating and/or aging process.

Where the antistatic layer is positioned on a surface of the first substrate layer, which is opposite to the adhesive layer, the adhesive layer may be produced according to the above-described method by applying the adhesive composition to the surface of the antistatic layer.

The thickness of the adhesive layer may be appropriately selected in consideration of the purpose of the present disclosure. For example, the thickness of the adhesive layer may be 10 μm or more, 30 μm or more, or 45 μm or more. For example, the thickness of the adhesive layer may be 200 μm or less, 150 μm or less, 100 μm or less, or 90 μm or less.

(2) Release Film

The release film may include: a second substrate layer; an antistatic layer positioned on at least one surface of the second substrate layer; and a release layer. The release film may include: a second substrate layer; an antistatic layer positioned on both surfaces of the second substrate layer; and a release layer.

According to one embodiment of the present disclosure, the release film serves to protect the adhesive layer of the substrate film until the surface protective film is attached to an electronic component.

Referring to FIG. 1, the surface protective film 1000 may include the release film 10 and the substrate film 20, and the release film 10 may include a second substrate layer 101, antistatic layers 501 and 502, and a release layer 401.

The second substrate layer of the release film may include, but is not limited to, at least one selected from the group consisting of: polyethylene terephthalate; polytet-rafluoroethylene; polyethylene; polypropylene; polybutene; polybutadiene; a vinyl chloride copolymer; polyurethane; ethylene-vinyl acetate; an ethylene-propylene copolymer; an ethylene-ethyl acrylate copolymer; an ethylene-methyl acry-late copolymer; polyimide; nylon; a styrene-based resin or elastomer; a polyolefin-based resin or elastomer; other elastomers; a polyoxyalkylene-based resin or elastomer; a poly-ester-based resin or elastomer; a polyvinyl chloride-based resin or elastomer; a polycarbonate-based resin or elastomer; a polyphenylene sulfide-based resin or elastomer; mixtures of hydrocarbons; a polyamide-based resin or elastomer; an acrylate-based resin or elastomer; an epoxy-based resin or elastomer; a silicone-based resin or elastomer; and liquid crystal polymers.

The thickness of the second substrate layer may be appropriately selected in consideration of the purpose of the present disclosure. For example, the thickness of the second substrate layer may be 25 μm to 150 μm, 25 μm to 125 μm, or 25 μm to 100 μm.

Details regarding on the antistatic layer(s) included in the release film may be the same as described above with respect to the antistatic layer(s) of the substrate film.

The material of the release layer may be appropriately selected in consideration of the purpose of the present disclosure. As the release layer, a conventional polymer film known in the art to which the present disclosure pertains may be used. For example, a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copoly-mer film, an ethylene-ethyl acrylate copolymer film, an ethylene-methyl acrylate copolymer film, or a polyimide film may be used, but the release layer is not limited thereto.

The thickness of the release layer may be appropriately selected in consideration of the purpose of the present disclosure. For example, the thickness of the release layer may be 500 nm or less, preferably 10 nm to 500 nm, 10 nm to 300 nm, or 10 nm to 200 nm.

The surface protective film according to one embodiment of the present disclosure may have a peel force of 30 gf/in or less as measured at a peel angle of 180° and a peel speed of 20 m/min after attachment to glass.

The surface protective film according to one embodiment of the present disclosure may have a peel force of 4 gf/in or less as measured at a peel angle of 180° and a peel speed of 0.3 m/min after attachment to glass.

The surface protective film according to one embodiment of the present disclosure may have a residual adhesion rate of 70% or more, as measured after the surface protective film is attached to glass, stored under conditions of 60° C. temperature and 90% relative humidity for 10 days, and then peeled off from the glass.

The term "residual adhesion rate" refers to a parameter indicating the degree to which the components of the adhesive layer of the surface protective film remain on the surface of the adherend after peeling. A higher residual adhesion rate may mean that smaller amounts of the components of the adhesive layer of the surface protective film remain on the surface of the adherend after peeling.

The residual adhesion rate may be measured by calculating the ratio of adhesion (B), measured when peeling off a reference adhesive film attached to the surface protective film according to one embodiment of the present disclosure after the surface protective film is attached to glass, stored under conditions of 60° C. temperature and 90% relative humidity for 10 days, and then peeled off from the glass, to adhesion (A) measured when peeling off the reference adhesive film attached to glass without previously attaching the surface protective film.

The reference adhesive film may have a peel force of 1,600 gf/in to 2,400 gf/in as measured when peeling off the reference adhesive film at a peel speed of 0.3 m/min and a peel angle of 180° from glass after attachment to the glass.

According to one embodiment of the present disclosure, the residual adhesion rate may be calculated from the values of adhesion (A) and (B) according to Equation 1 below.

$$\text{Residual adhesion rate } (\%)=100\times(B)/(A) \qquad \text{[Equation 1]}$$

Hereinafter, the present disclosure will be described in detail with reference to examples. However, the examples according to the present disclosure may be modified into various different forms, and the scope of the present disclosure is not interpreted as being limited to the examples described below. The examples of the present specification are provided to more completely explain the present disclosure to those skilled in the art.

EXAMPLES

Production Example 1

A monomer mixture containing 89 parts by weight of butyl methacrylate, 7 parts by weight of stearyl methacrylate, 2 parts by weight of hydroxybutyl acrylate, and 2 parts by weight of tridecafluorooctyl acrylate was introduced into a 1-L reactor, containing refluxed nitrogen gas and equipped with a cooling device for easy temperature adjustment, and then toluene as a solvent was introduced. After the mixture was uniformly mixed, the reactor temperature was maintained at 120° C., and benzoyl peroxide (BPO) as a reaction initiator was added to the mixture in an amount of 1.6 parts by weight based on 100 parts by weight of the monomer mixture, followed by reaction for about 4 hours. After completion of the reaction, the reaction solution was additionally diluted with toluene, thus producing a (meth)acrylate copolymer having a weight-average molecular weight of 27,000 g/mol.

Production Examples 2 to 13

Meth(acrylate) copolymers were produced in the same manner as in Production Example 1, except that monomer mixtures were prepared using the components and contents shown in Table 1 below, and the content of the initiator was controlled as shown in Table 1 below. In addition, the molecular weights of the produced copolymers are shown in Table 1 below.

14

TABLE 1

| | (A) | (B) | (C) | (D) | Initiator | Weight-average molecular weight (g/mol) |
|---|---|---|---|---|---|---|
| Production Example 1 | BMA 89 | STMA 7 | HBA 2 | V13F 2 | 1.6 | 27,000 |
| Production Example 2 | BMA 89 | STMA 7 | HBA 2 | V13F 2 | 1.2 | 42,000 |
| Production Example 3 | BMA 88 | STMA 7 | HBA 3 | V13F 2 | 1.2 | 41,000 |
| Production Example 4 | BMA 87 | STMA 7 | HBA 3 | V13F 3 | 1.5 | 30,000 |
| Production Example 5 | BMA 85 | STMA 7 | HBA 5 | V13F 3 | 1.5 | 30,000 |
| Production Example 6 | BMA 85 | STMA 3 | HBA 5 | V13F 3 | 1.5 | 30,000 |
| Production Example 7 | BMA 86 | STMA 3 | HBA 8 | V13F 3 | 1.5 | 30,000 |
| Production Example 8 | BMA 86 | STA 3 | HBA 8 | V13F 3 | 1.5 | 30,000 |
| Production Example 9 | BMA 89 | BHA 3 | HBA 5 | V13F 3 | 1.5 | 30,000 |
| Production Example 10 | BMA 95 | — | HBA 5 | — | 1.5 | 29,000 |
| Production Example 11 | BMA 89 | STMA 7 | HBA 2 | V13F 2 | 3 | 4,500 |
| Production Example 12 | BMA 89 | STMA 7 | HBA 2 | V13F 2 | 0.4 | 90,000 |
| Production Example 13 | BMA 89 | STMA 7 | HBA 2 | V13F 2 | 0.1 | 145,000 |

In Table 1, (A) BMA stands for butyl methacrylate, (B) STMA stands for stearyl methacrylate, STA stands for stearyl acrylate, BHA stands for behenyl arylate, (C) HBA stands for hydroxy butylacrylate, and (D) V13F stands for tridecafluorooctyl acrylate. In addition, the contents are in units of parts by weight based on 100 parts by weight of the monomer mixture.

Example 1

An adhesive composition was prepared by mixing 100 parts by weight of a urethane resin (weight-average molecular weight: 120,000; SH-101, Toyochem Co., Ltd.) with 1.5 parts by weight of the (meth)acrylate copolymer produced in Production Example 1, and 15 parts by weight of a mixture containing an isocyanurate isocyanate trimer and an isophorone diisocyanate at a weight ratio of 7:3 (DR7030X, Samyoung Ink Co., Ltd.) as a polyfunctional isocyanate curing agent.

The adhesive composition was applied to one surface of a PET film having antistatic layers provided on both surfaces thereof, and dried in a Mathis oven at 140° C. for about 3 minutes to form an adhesive layer, and a release film (RF02ASW, SKC) was laminated onto the adhesive layer. Thereafter, the resulting film structure was aged in an oven at 40° C. for about 5 days, thereby producing a surface protective film.

Examples 2 to 9 and Comparative Examples 1 to 7

Surface protective films were produced in the same manner as in Example 1, except that the components and contents were changed as shown in Table 2 below.

TABLE 2

| | Type of copolymer | Content (parts by weight) of copolymer | Content (parts by weight) of curing agent |
|---|---|---|---|
| Example 1 | Production Example 1 | 1.5 | 15 |
| Example 2 | Production Example 2 | 1.5 | 15 |
| Example 3 | Production Example 3 | 1.5 | 15 |
| Example 4 | Production Example 4 | 1.5 | 15 |
| Example 5 | Production Example 5 | 1.5 | 20 |
| Example 6 | Production Example 6 | 3.0 | 15 |
| Example 7 | Production Example 7 | 5.0 | 20 |
| Example 8 | Production Example 8 | 2.5 | 15 |
| Example 9 | Production Example 9 | 5.0 | 15 |
| Comparative Example 1 | Production Example 10 | 2.5 | 15 |
| Comparative Example 2 | ATBC | 60 | 15 |
| Comparative Example 3 | Production Example 11 | 1.5 | 15 |
| Comparative Example 4 | Production Example 12 | 1.5 | 15 |
| Comparative Example 5 | Production Example 13 | 1.5 | 15 |
| Comparative Example 6 | Production Example 11 | 1.0 | 15 |
| Comparative Example 7 | Production Example 12 | 3.0 | 15 |

In Table 2 above, the content (parts by weight) is a value based on 100 parts by weight of the urethane resin, and ATBC stands for acetyl tributyl citrate (ATBC, Asahi Kasei Corp.) as a peel force controlling agent.

Experimental Example 1: Measurement of Low-Speed Peel Force

The surface protective film produced in each of Examples 1 to 9 and Comparative Examples 1 to 7 was cut to size of 25 mm (width)×250 mm (length), and the release film was peeled off therefrom. The adhesive surface of each surface protective film from which the release film has been peeled off was cleaned with ethanol and attached by a 2-kg roller to glass (Corning) dried at 100° C. for 20 minutes. Next, the resulting materials were stored at a temperature of 50° C. and 5 atm for 20 minutes, and then stored at a temperature of 25° C. for 24 hours. Thereafter, the peel force of each surface protective film when peeling off the surface protective film from the glass at a peel speed of 0.3 m/min and a peel angle of 180° was measured using a texture analyzer (Stable Micro Systems Inc., UK).

Experimental Example 2: Measurement of High-Speed Peel Force

The surface protective film produced in each of Examples 1 to 9 and Comparative Examples 1 to 7 was cut to size of 25 mm (width)×250 mm (length), and the release film was peeled off therefrom. The adhesive surface of each surface protective film from which the release film has been peeled off was cleaned with ethanol and attached by a 2-kg roller to glass (Corning) dried at 100° C. for 20 minutes. Next, the resulting materials were stored at a temperature of 50° C. and 5 atm for 20 minutes, and then stored at a temperature of 25° C. for 24 hours. Thereafter, the peel force of each surface protective film when peeling off the surface protective film from the glass at a peel speed of 20 m/min and a peel angle of 180° was measured using a high-speed peel tester (Peel Tester SJTA-034SD, Samjitech).

Experimental Example 3: Evaluation of Residual Adhesion Rate after Storage in High-Temperature and High-Humidity Environment A reference adhesive film (a 50-μm-thick acrylic adhesive layer and a 50-μm-thick PET substrate film, LG Chem Co., Ltd.) was prepared, which had a peel force of 2,000±400 gf/in as measured when peeling off from glass at a peel force of 0.3 m/min and a peel angle of 180° after attachment to the glass.

Measurement of Adhesion (A)

The reference adhesive film was cut to size of 25 mm (width)×250 mm (length), and the release film was peeled off therefrom. The reference adhesive film from which the release film has been peeled off was cleaned with ethanol and attached to glass (Corning) dried at 100° C. for 20 minutes.

Next, the resulting material was stored in an oven at 40° C. for 1 hour, and then stored at 25° C. for 4 hours. Next, the peel force when peeling off the reference adhesive film from the glass at a peel speed of 0.3 m/min and a peel angle of 180° was measured using a texture analyzer (Stable Micro Systems Inc., UK). The measured peel force was referred to as adhesion (A).

Measurement of Adhesion (B)

The release film of the surface protective film produced in each of Examples 1 to 9 and Comparative Examples 1 to 7 was peeled. The adhesive surface of each surface protective film was cleaned with ethanol and attached by a 2-kg roller to glass (Corning) dried at 100° C. for 20 minutes. Next, the resulting materials were stored at a temperature of 50° C. and 5 atm for 20 minutes, and then stored at a temperature of 25° C. for 24 hours, followed by storage in a thermohygrostat having a temperature of 60° C. and a relative humidity of 90% for 10 days. Thereafter, each glass having the surface protective film attached thereto was taken out and left at 25° C. for 24 hours, and then each surface protective film was peeled off from the glass.

The reference adhesive film was cut to size of 25 mm (width)×250 mm (length), and the release film was peeled off therefrom. Then, the reference adhesive film was attached to the glass surface from which the surface protective film has been removed. The resulting materials were stored in an oven at 40° C. for 1 hour, and then stored at 25° C. for 4 hours. Next, the peel force when peeling off the reference adhesive film from the glass at a peel speed of 0.3 m/min and a peel angle of 180° was measured using a texture analyzer (Stable Micro Systems Inc., UK). The measured peel force was referred to as adhesion (B).

Calculation of Residual Adhesion Rate

A residual adhesion rate was calculated from the values of adhesion (A) and adhesion (B) according to the following Equation 1.

$$\text{Residual adhesion rate (\%)} = 100 \times (B)/(A) \qquad \text{[Equation 1]}$$

Table 3 below shows the low-speed peel forces and high-speed peel forces of the surface protective films of Examples 1 to 9 and Comparative Examples 1 to 7, and the residual adhesion rates measured when peeling off the surface protective films after storage in the high-temperature and high-humidity environments.

TABLE 3

| | Low-speed peel force (gf/in) | High-speed peel force (gf/in) | Residual adhesion rate (%) after storage in high-temperature and high-humidity environment |
|---|---|---|---|
| Example 1 | 3.2 | 28 | 78 |
| Example 2 | 2.8 | 24 | 84 |
| Example 3 | 2.4 | 21 | 88 |
| Example 4 | 2.0 | 20 | 85 |
| Example 5 | 1.5 | 15 | 85 |
| Example 6 | 1.2 | 12 | 82 |
| Example 7 | 1.0 | 12 | 81 |
| Example 8 | 1.3 | 14 | 89 |
| Example 9 | 1.1 | 11 | 85 |
| Comparative Example 1 | 5.1 | 58 | 72 |
| Comparative Example 2 | 4.8 | 49 | 62 |
| Comparative Example 3 | 3.2 | 32 | 68 |
| Comparative Example 4 | 3.5 | 32 | 85 |
| Comparative Example 5 | 3.6 | 34 | 86 |
| Comparative Example 6 | 4.2 | 33 | 71 |
| Comparative Example 7 | 2.8 | 21 | 63 |

Referring to Table 3 above, it can be confirmed that the surface protective films of Examples 1 to 9 had high residual adhesion rates even after storage in the high-temperature and high-humidity environment, while the low-speed peel forces and high-speed peel forces thereof on the glass were low. That is, it can be confirmed that almost no residue was left on the glass.

On the other hand, it can be confirmed that, in the case of Comparative Example 1, the residual adhesion rate was somewhat high, but the low-speed peel force and the high-speed peel force were high.

In addition, it can be confirmed that, in the case of Comparative Example 2, the residual adhesion rate was very low, and thus the adhesive layer of the surface protective film left a large amount of residue on the glass, and the low-speed peel force and the high-speed peel force were also high.

In addition, it can be confirmed that, in the case of Comparative Example 3, the residual adhesion rate was very low, and thus the adhesive layer of the surface protective film left a large amount of residue on the glass, and the high-speed peel force was high.

In addition, it can be confirmed that, in the case of Comparative Examples 4 to 6, the residual adhesion rate was high, and thus the adhesive layer of each surface protective film left little on the glass, but the high-speed peel force was high.

In addition, it can be confirmed that, in the case of Comparative Example 7, the low-speed and high-speed peel forces were low, but the residual adhesion rate was low, and thus the adhesive layer of the surface protective film left a large amount of residue.

DESCRIPTION OF REFERENCE NUMERALS

1000: surface protective film

10: release film

20: substrate film

101: second substrate layer

201: first substrate layer

301: adhesive layer

401: release layer

501, 502, 503, 504: antistatic layer

What is claimed is:

1. An adhesive composition comprising:
a hydroxyl group-containing urethane resin;
an isocyanate-based curing agent; and
a (meth)acrylate copolymer,
  wherein the (meth)acrylate copolymer is obtained by polymerization from a monomer mixture which contains a (meth)acrylate monomer containing a hydroxyl group, a (meth)acrylate monomer containing a fluorinated substituent, an alkyl (meth)acrylate monomer having 1 to 10 carbon atoms, and an alkyl (meth) acrylate monomer having 12 to 22 carbon atoms,
  wherein the (meth)acrylate copolymer has a weight-average molecular weight of 20,000 to 70,000,
  wherein the (meth)acrylate copolymer is contained in an amount of 0.5 to 5 parts by weight based on 100 parts by weight of the hydroxyl group-containing urethane resin, and
  wherein a surface protective film comprising an adhesive layer formed from the adhesive composition has a peel force of 30 gf/in or less as measured at a peel angle of 180° and a peel speed of 20 m/min after attachment to glass.

2. The adhesive composition of claim 1, wherein the hydroxyl group-containing urethane resin has a weight-average molecular weight of 50,000 to 200,000.

3. The adhesive composition of claim 1, wherein the isocyanate-based curing agent is contained in an amount of 10 to 30 parts by weight, based on 100 parts by weight of the hydroxyl group-containing urethane resin.

4. The adhesive composition of claim 1, wherein the monomer mixture contains more than 0 to not more than 10 wt % of the (meth)acrylate monomer containing a hydroxyl group, more than 0 to not more than 10 wt % of the (meth)acrylate monomer containing a fluorinated substituent, 70 to 95 wt % of the alkyl (meth)acrylate monomer having 1 to 10 carbon atoms, and 1 to 10 wt % of the alkyl (meth)acrylate monomer having 12 to 22 carbon atoms.

5. The adhesive composition of claim 1, wherein the (meth)acrylate monomer containing a hydroxyl group comprises at least one of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, and 2-hydroxypropylene glycol (meth)acrylate.

6. The adhesive composition of claim 1, wherein the (meth)acrylate monomer containing a fluorinated substituent comprises at least one of trifluoroethyl (meth)acrylate, tetrafluoro-n-propyl (meth)acrylate, tetrafluoro-t-pentyl (meth) acrylate, hexafluorobutyl (meth)acrylate, hexafluoro-t-hexyl (meth)acrylate, hexafluoro-2,4-bis (trifluoromethyl) pentyl (meth)acrylate, hexafluorobutyl (meth)acrylate, hexafluoroisopropyl (meth)acrylate, heptafluorobutyl (meth)acrylate, octafluoropentyl (meth)acrylate, nonafluoropentyl (meth) acrylate, dodecafluoroheptyl (meth)acrylate, dodecafluorooctyl (meth)acrylate, tridecafluorooctyl (meth)acrylate, tridecafluoroheptyl (meth)acrylate, hexadecafluorodecyl (meth)acrylate, heptadecafluorodecyl (meth)acrylate, octadecafluoroundecyl (meth)acrylate, nonadecafluoroundecyl (meth)acrylate, and eicosafluorododecyl (meth)acrylate.

7. The adhesive composition of claim 1, wherein the alkyl (meth)acrylate monomer having 1 to 10 carbon atoms comprises at least one of methyl (meth)acrylate, ethyl (meth) acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)

19 acrylate, 2-ethylbutyl (meth)acrylate, n-octyl (meth)acrylate, isooctyl (meth)acrylate, and isononyl (meth)acrylate.

8. The adhesive composition of claim 1, wherein the alkyl (meth)acrylate monomer having 12 to 22 carbon atoms comprises at least one of lauryl (meth)acrylate, tetradecyl (meth)acrylate, stearyl (meth)acrylate, cetyl (meth)acrylate, behenyl (meth)acrylate, and eicosyl (meth)acrylate.

9. A surface protective film comprising a release film and a substrate film, wherein the substrate film comprises: a first substrate layer; an antistatic layer positioned on at least one surface of the first substrate layer; and an adhesive layer comprising a cured product of the adhesive composition according to claim 1, and the release film and the adhesive layer are in direct contact with each other.

10. The surface protective film of claim 9, wherein the release film comprises: a second substrate layer; antistatic layers positioned on both surfaces of the second substrate layer; and a release layer.

11. The surface protective film of claim 9, which has a peel force of 30 gf/in or less as measured at a peel angle of 180° and a peel speed of 20 m/min after attachment to glass.

12. The surface protective film of claim 9, which has a peel force of 4 gf/in or less as measured at a peel angle of 180° and a peel speed of 0.3 m/min after attachment to glass.

13. The surface protective film of claim 9, which has a residual adhesion rate of 70% or more, as measured after the surface protective film is attached to glass, stored under conditions of 60° C. temperature and 90% relative humidity for 10 days, and then peeled off from the glass.

\* \* \* \* \*